United States Patent
Farnsworth

(10) Patent No.: US 6,547,183 B2
(45) Date of Patent: Apr. 15, 2003

(54) MOVEABLE CLOSET

(75) Inventor: Jeffrey D. Farnsworth, Marysville, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/921,212

(22) Filed: Aug. 2, 2001

(65) Prior Publication Data

US 2003/0025036 A1 Feb. 6, 2003

(51) Int. Cl.$^7$ .............................................. B64D 11/00
(52) U.S. Cl. .................................. 244/118.1; 244/118.5; 244/118.6; 312/247; 312/312
(58) Field of Search ......................... 244/118.1, 118.5, 244/118.6, 137.1, 119, 117 R; 312/247, 248, 242, 312, 266, 269, 319.5, 319.8, 319.1; 187/24

(56) References Cited

U.S. PATENT DOCUMENTS

| | | | | |
|---|---|---|---|---|
| 2,499,791 A | * | 3/1950 | Spencer | 312/247 |
| 4,275,942 A | * | 6/1981 | Steidl | 244/247 |
| 4,314,733 A | | 2/1982 | Smith | |
| 5,314,143 A | * | 5/1994 | Luria | 244/118.1 |
| 5,456,529 A | | 10/1995 | Cheung | |
| 5,820,076 A | * | 10/1998 | Schumacher et al. | 244/118.5 |
| 6,059,229 A | * | 5/2000 | Luria | 244/118.1 |
| 6,250,728 B1 | * | 6/2001 | Thorp | 312/247 |
| 6,336,692 B1 | * | 1/2002 | Snyder | 312/312 |

FOREIGN PATENT DOCUMENTS

| | | |
|---|---|---|
| DE | 36 40 284 A | 6/1988 |
| DE | 195 37 135 A | 4/1997 |
| DE | 297 09 636 U | 7/1997 |
| EP | 1 116 651 A | 7/2001 |

OTHER PUBLICATIONS

US 2002/0074913 a1 Lau et al Jun. 20, 2002.*

* cited by examiner

Primary Examiner—Galen L. Barefoot
(74) Attorney, Agent, or Firm—Alston & Bird LLP

(57) ABSTRACT

A moveable closet for storing articles in an aircraft includes a fixed outer housing and a moveable inner housing capable of being displaced from a loading position for articles to be placed within a storage compartment to a stowed position, which allows for additional cabin space during taxiing and flight. The storage compartment defined by the inner housing may be further sub-divided by shelves for storing articles of various sizes and may also be fitted with bars in order to accommodate hanging items. The moveable closet is capable of being accessed from a lengthwise extending aisle and therefore may be located directly adjacent a fixed structure on an aircraft such as a lavatory, galley, fixed closet, or the like. Once the storage compartment defined by the inner housing is loaded with articles, it is displaced into the outer housing to provide additional cabin space for passenger leg room or seating.

25 Claims, 2 Drawing Sheets

MOVEABLE CLOSET

FIELD OF THE INVENTION

The present invention relates to closets, such as the closets onboard an aircraft or the like and, more particularly, a moveable closet for increasing available cabin space.

BACKGROUND OF THE INVENTION

Airlines are continually looking for new ways to better utilize the cabin space inside their aircraft, balancing the desire to carry as many passengers as possible in as comfortable a manner as possible with the need for adequate storage space. By minimizing the amount of space that is required to store carry-on luggage and other items, the cabin space available for passengers is maximized. As such, extra rows of seats may be added and/or additional seat recline or additional leg room may be provided.

Each passenger is allowed carry-on luggage, which may be stowed under the seats or in the overhead compartments. Some luggage is too bulky to fit in these areas or, as is the case with an overcoat or jacket, may not be the type of article that a passenger would feel comfortable stuffing into an overhead bin or under the seat in front of them. One solution to this problem is the addition of a relatively large closet typically located in the vicinity of the galley and/or lavatories in the aircraft cabin. These closets are generally large enough to stow coats, hanging bags, larger carry-on luggage. Unfortunately, while these closets do solve problems with storage, they also occupy space on the aircraft that may otherwise be taken by additional seats or allowances for leg room. This problem is further complicated by the necessity of an aisle or walkway that allows flight attendants to access the closet.

A storage system that offers one solution to this conflict between the need for storage and the desire for more seating space is found on some MD-11™ and DC-10™ aircraft. While the storage system onboard these models of aircraft solved some of the storage difficulties that airlines were having, the storage system did not completely resolve all of these problems, and in fact raised some new issues. The storage system consisted primarily of a bar, which was lowered prior to and following a flight to allow a flight attendant to remove and add hanging items. Once the bar was loaded, it could be raised into a space located at least partially above the cabin during flight. The storage system also included doors that could be closed to prevent access to the hanging items once the bar was raised. The storage system of the MD-11™ and DC-10™ aircraft was located proximate a cross aisle that extended between two lengthwise extending aisles. The bar also extended laterally or crosswise such that, hanging items could, as a practical matter, only be hung on or removed from the bar while standing in the cross aisle.

While the MD-11™ and DC-10™ storage system did allow for the storage of items like clothing, the storage system still took up additional room on the aircraft. In this regard, the raising bar was capable of moving a number of items up and out of the way during flight, but the storage system still had a relatively large footprint on the aircraft and required a cross aisle, which was needed to load the bar. Further, there could be problems with the storage of the clothing itself. When the clothes were pulled up into the storage space they were pushed tightly together, which led to the wadding and wrinkling of the items. In some instances, where the bar was heavily loaded, it was necessary for a flight attendant to push items into the storage space in order to permit the bar to be fully raised. While this closet did begin to address the difficulties raised by the need for proper storage and the importance of cabin space, it did not fully solve the problem. For these reasons it could be desirable to provide proper storage of items while maximizing the cabin space available for seating during transit.

SUMMARY OF THE INVENTION

An interior assembly, such as for an aircraft, is therefore provided that includes a moveable closet which allows for storage of articles while maximizing cabin space. As a result of the design of the moveable closet, the closet protects items placed into its storage compartment so as to avoid wadding of the items as the closet is moved to a stowed position during flight. In addition, the moveable closet can be loaded from the lengthwise extending aisle of an aircraft and, as such, need not be placed adjacent a cross aisle.

According to the present invention, a moveable closet is therefore provided that includes an outer housing which is typically fixed in position and an inner housing. The inner housing defines an opening for accessing a storage compartment, and is capable of being moved between a loading position and a stowed position. When the inner housing is in the loading position, such as prior to and following the flight, articles are inserted through the opening and into the storage compartment. Advantageously, the opening defined by the inner housing faces a lengthwise extending aisle such that articles may be inserted into the storage compartment while standing in the lengthwise extending aisle.

The outer housing generally includes at least one door for closing an uppermost portion of the opening, and each door is capable of being opened to access the top portion of the storage compartment when the inner housing is in the loading position. The inner housing may also include shelves for dividing the storage compartment and/or bars for hanging articles.

The moveable closet preferably also includes an actuation mechanism for moving the inner housing between the loading and stowed positions. This actuation mechanism may include a motor capable of moving the inner housing between the loading and stowed positions. The moveable closet may also include at least one track for guiding the inner housing between the loading and stowed positions. As such, in the loading position, the inner housing is generally readily accessible to facilitate loading and unloading of articles, such as prior to and following flight. In order to provide additional cabin space during flight, however, the inner housing may be stowed. When the inner housing is in the stowed position, the inner housing is at least partially disposed within the outer housing.

In one preferred embodiment, the moveable closet is a portion of an interior assembly on an aircraft. In addition to the moveable closet, the interior assembly will include a structure fixed in position within the aircraft cabin. The structure includes at least one wall defining a region of the aircraft, and be, for example, a lavatory, galley or fixed closet. The moveable closet will be disposed immediately adjacent to the fixed structure, such that the structure blocks access to a portion of the moveable closet.

The interior assembly of one preferred embodiment will include a moveable closet that is capable of being vertically displaced between the loading and stowed positions, such as by being adapted to be raised upwardly from the loading to the stowed position. This interior assembly may also include a seat proximate to the moveable closet. This seat is preferably capable of being reclined partially under the moveable closet once the moveable closet was in the stowed position.

Accordingly, the moveable closet of the present invention allows a flight attendant to load items into the moveable closet while the aircraft is on the ground, and then move the closet into its stowed position, creating additional cabin space on the aircraft. Additionally, cabin space is maximized by accessing the closet from the lengthwise extending aisle rather than requiring a space-consuming cross aisle. The additional cabin-space on the aircraft provided by the moveable closet, may be used for additional seats and/or seat recline or leg room. However, the design of the moveable closet protects articles placed therein.

BRIEF DESCRIPTION OF THE DRAWINGS

Figure 1:
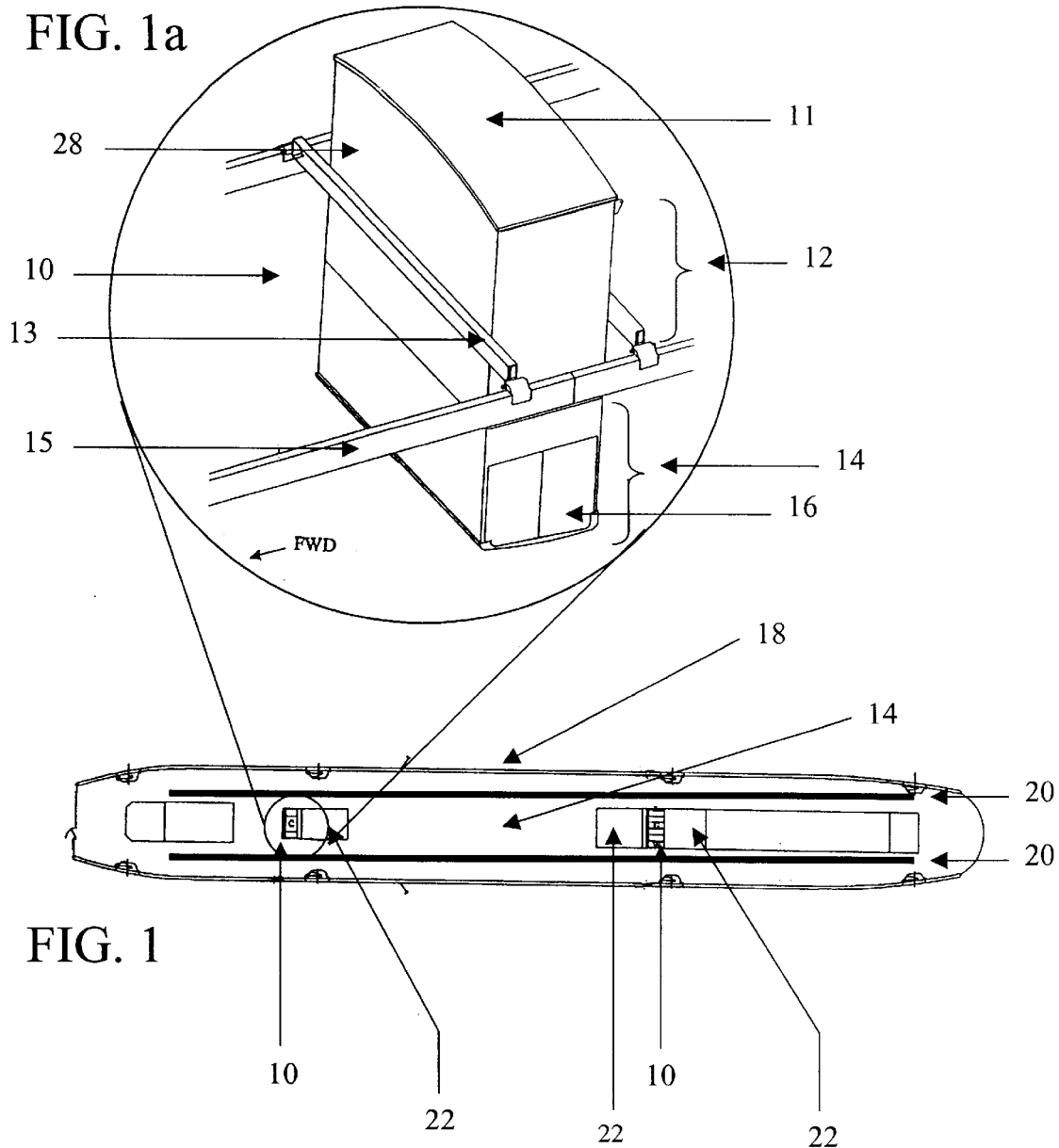
Figure 2:
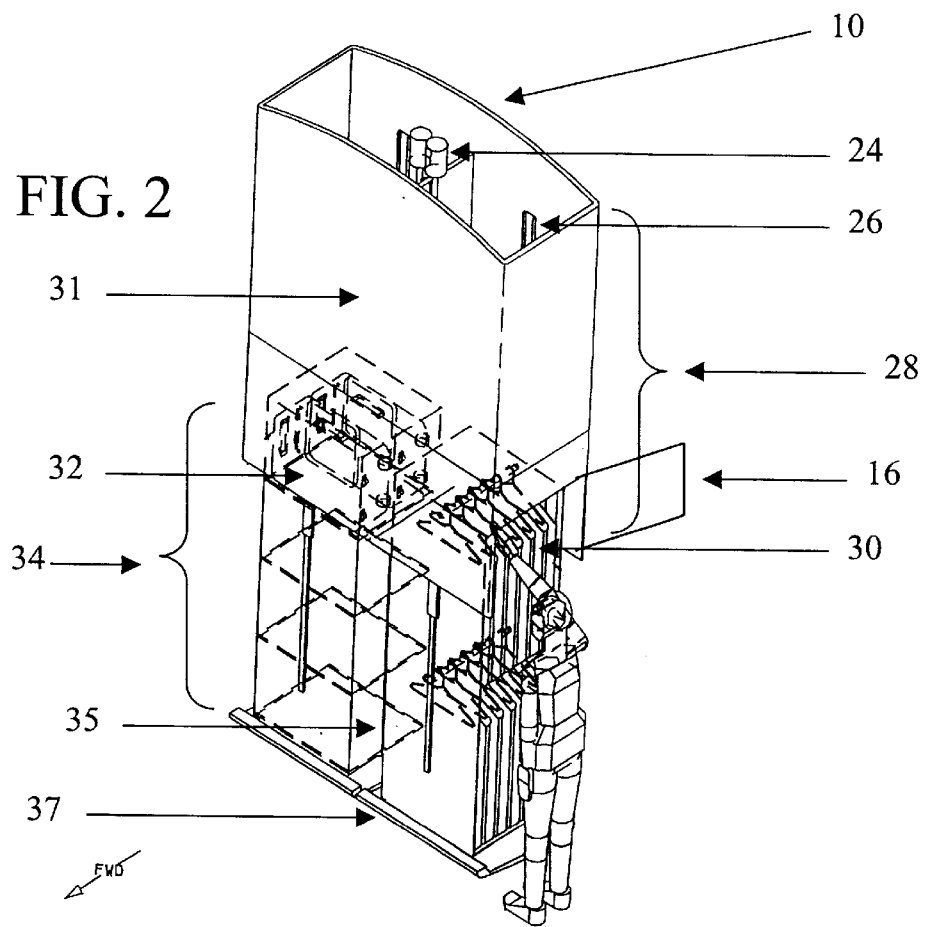
Figure 3:
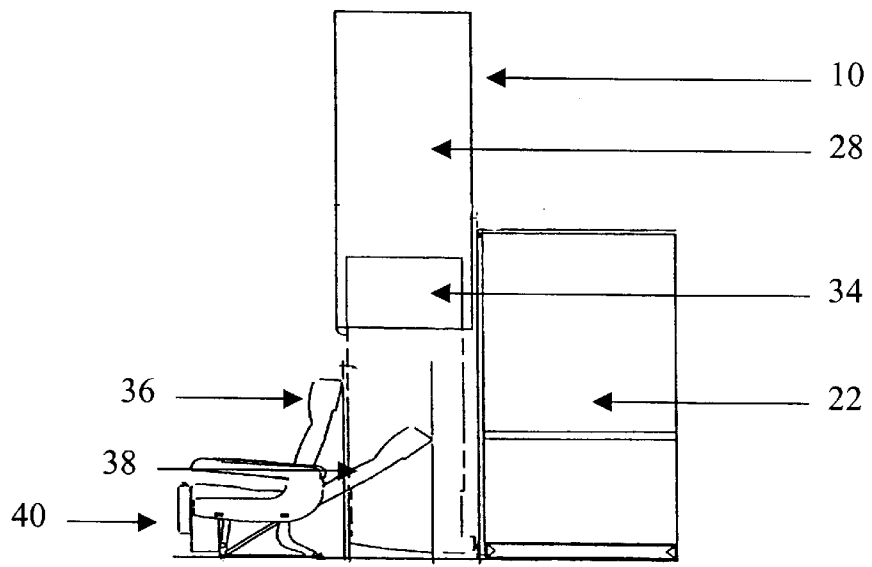

Having thus described the invention in general terms, reference will now be made to the accompanying drawings, which are not necessarily drawn to scale, and wherein:

FIG. 1 is a schematic plan view of the cabin of an aircraft according to an embodiment of the present invention which includes a moveable closet disposed immediately adjacent to a fixed structure, such as a galley or a lavatory;

FIG. 1a is a perspective view of the moveable closet of FIG. 1 in the stowed position in which the moveable closet is only partially within the interior of the cabin with the remainder of the moveable closet being in the space above the aircraft ceiling;

FIG. 2 is a perspective view of a moveable closet in the loading position according to an embodiment of the present invention; and FIG. 3 is a schematic side view of a moveable closet disposed between a fixed structure and an airline seat according to an embodiment of the present invention.

DETAILED DESCRIPTION OF THE INVENTION

Various embodiments of the invention are set forth below. While the invention is described with reference to specific embodiments, such as its use in conjunction with aircraft, it will be understood that the invention is not intended to be so limited. To the contrary, the invention includes numerous alternatives, modifications and equivalents as will become apparent from consideration of the present specification including the drawings. Specifically, it should be apparent that this closet could be used in numerous situations where floor space is critical such as a cruise ship, train or movie theater.

Referring now to FIG. 1, the cabin 14 of an aircraft 18 is illustrated. The cabin 14 includes several fixed structures 22 such as galleys, lavatories, fixed closets or the like. The cabin 14 also includes at least one lengthwise extending aisle 20 running the length of the cabin and, in the illustrated embodiment, generally includes a pair of lengthwise extending aisles on opposite sides of the fixed structures 22. As will be apparent, the cabin also includes a plurality of passenger seats, which seats have been omitted from the illustrations for purposes of clarity.

According to the present invention, the cabin 14 also includes a moveable closet 10. The moveable closet 10 may be disposed immediately adjacent a fixed structure 22 in the aircraft cabin 14, and in one instance the moveable closet 10 is placed between two immediately adjacent fixed structures 22. For example, the moveable closet 10 may be adjacent to a lavatory or galley on an aircraft or a state room on a cruise ship or train. As described below, the moveable closet 10 is particularly well adapted to being adjacent a fixed structure 22 since the moveable closet 10 is accessible from one lengthwise extending aisle 20 such that access is not required from either the front or rear of the closet.

As shown in more detail in the perspective view in FIG. 1a, the moveable closet 10 is capable of being at least partially displaced out of the cabin 14 and into the crown 12 of the aircraft, i.e., the space above the cabin ceiling, while the aircraft is in flight to provide additional cabin space. As further illustrated in FIGS. 2 and 3, the moveable closet 10 consists of an inner housing 34 and an outer housing 28. The inner housing 34 is capable of being moved from a loading position as depicted in FIG. 2 to the stowed position of FIG. 1a. The moveable closet 10 will generally be in the loading position while passengers are embarking and disembarking for the purpose of receiving articles for storage during flight, or for permitting articles to be removed as passengers exit the plane. In contrast, the moveable closet 10 is generally in the stowed position when the plane is taxiing on the runway and in flight, in order to provide additional cabin space.

The inner housing 34 generally has a floor panel 37 that defines the bottom of the closet, and side walls 35 that extend upwardly from the floor panel to define the storage compartment. The storage compartment is preferably open on at least one and, more preferably, both ends to permit insertion and removal of articles by a person standing in a lengthwise extending aisle 20. The inner housing 34 may be used as one large storage compartment, ideal for stowing large pieces of luggage, compressed garbage blocks or the like. As can be seen from the illustrated embodiment, the inner housing 34 may also contain shelves 32 for subdividing the storage compartment. These shelves 32 can be used to further divide the inner housing 34 and allow for the storage of a number of smaller articles. Additionally or alternatively, the inner housing 34 may contain bars 30 for hanging articles, such as garment bags, coats or any other type of hanging luggage. Hanging items and pieces of luggage would generally be placed in the storage compartment defined by the inner housing 34 as passengers brought these items onto the plane. The inner housing would then preferably be displaced into the outer housing 28, to allow additional cabin space during the flight. When the plane reaches its destination, the inner housing would be lowered, and passengers could retrieve their items as they disembark.

Once the inner housing 34 has been loaded, it is moved to the stowed position, preferably fitting snuggly into the outer housing 28. As shown in FIG. 1a, the outer housing 28 is at least partially disposed within the crown of the aircraft so as to be removed from the cabin area. While the outer housing 28 may be completely disposed within the crown, the lowermost portion of the outer housing 28 of the illustrated embodiment is positioned within the cabin, albeit proximate the ceiling. The portion, if any, of the outer housing 28 that is positioned within the cabin is typically determined by the space available in the crown of the aircraft and the length of the inner housing 34. In this regard, in instances in which the length of the inner housing 34 is greater than the space available for the outer housing in the crown, lower portions of the outer housing 28 will extend into the cabin 14 in order to permit the inner housing 28 to be completely withdrawn into the outer housing 28.

The outer housing 28 of the moveable closet 10 may be secured in position, such as within the crown of an aircraft, in various manners, only a few of which will be described hereinbelow for purposes of example. As illustrated in FIG.

1a, the outer housing 28 of the moveable closet 10 may be attached to and therefore supported by lengthwise extending frame members 15, as well as crosswise frame members 13 extending between the lengthwise extending frame members 15. Alternatively, a support structure could extend directly down from upper portions of the crown 12 of the aircraft for securing the moveable closet therein. Still further, the moveable closet 10 may be directly attached to upper portions of the crown so as to extend downwardly therefrom.

The outer housing 28, of the illustrated embodiment has side walls 31 on four sides to truly define a volume that is preferably sized to snuggly receive the inner housing 34. As shown, these side walls 31 serve to cover the openings to the storage compartment of the inner housing 34, thereby protecting the articles stored within the storage compartment within crumpling or wadding the articles as in some conventional designs. In embodiments in which the side walls 31 of the outer housing 28 extend partially into the cabin 14 of the aircraft, the outer housing 28 contains at least one door 16 for accessing the top part of the inner housing 34, when the inner housing 34 is in the loading position, since the top part of the inner housing 34 will generally remain within the outer housing 28. When the inner housing 34 is in the stowed position, the floor panel 37 of the inner housing 34 serves as the bottom panel of the outer housing 28, thereby closing the closet from any access from the cabin 14. The outer housing 28 may also include a top panel 11 as illustrated in FIG. 1a.

The moveable closet 10 is also preferably fitted with at least one and, more typically a plurality of tracks 26 for guiding the inner housing 34 between the loading and stowed positions. For example, as illustrated in FIG. 2, a plurality of tracks extend vertically along the interior of the side walls 31 of the outer housing 28 for engaging corresponding tracks extending vertically along the side walls of the inner housing 34. While tracks are useful for guiding movement of the inner housing 34 with respect to the outer housing 28, it should be understood that a number of various alternative mechanisms for guiding the inner housing 34 may be utilized. Alternatively, the inner housing 34 and the outer housing 28 may be sized tightly enough and may be constructed of material(s) having a sufficiently low coefficient of friction to permit the snugness of the fit of the inner housing 34 within the outer housing 28 to guide the movement therebetween.

Although the moveable closet 10 may be manually moved, the moveable closet 10 is typically moved through the use of an actuation mechanism. Various actuation mechanisms may be utilized. For example, the actuation mechanism may include a motor 24, such as a stepper motor, capable of moving the inner housing 34 between the loading and stowed positions. Although not shown in the figures, there would generally be a control mechanism, such as a switch or button, that the flight attendant could actuate to move the inner housing 34 between the loading and stowed positions.

As shown in FIG. 3, since the moveable closet 10 does not require a cross aisle for accessing the articles contained within it, the moveable closet 10 can be placed immediately adjacent to a fixed structure 22. This fixed structure 22 could be any of a number of necessary structures, but on an aircraft would most likely be a lavatory, galley or an additional fixed closet.

Another advantage of the moveable closet 10, as illustrated in FIG. 3, is the additional space it allows for passenger seats 40. Since the moveable closet 10 can be displaced after it has been loaded, allowing for additional floor space within the cabin, passenger seats 40 can be placed much closer to the moveable closet 10 and still allow the passenger to move the seat 40 to the reclined position 38 once the closet has been displaced, such as while in transit. While the moveable closet 10 is in the loading position, which generally occurs while passengers are embarking and disembarking, the passenger seat 40 would need to be in the upright position 36. When the inner housing 34 of the moveable closet 10 is in the stowed position inside the outer housing 28, it is possible for a passenger to move the seat to the reclined position 38. As shown in FIG. 3, the inner housing 34 is preferably capable of raising high enough into the outer housing 28 to allow for adequate head clearance for the passenger and prevent the passenger from feeling claustrophobic once reclined beneath the moveable closet 10.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A moveable closet comprising:
    an outer housing having at least one door; and
    an inner housing defining a storage compartment and further defining an opening for accessing the storage compartment, said inner housing capable of being moved between a loading position in which articles are inserted through the opening into the storage compartment and a stowed position in which said inner housing is at least partially disposed within said outer housing;
    wherein said inner and outer housings are configured such that a portion of said inner housing remains within said outer housing once said inner housing is fully moved into the loading position with respect to said outer housing, and wherein the at least one door of said outer housing closes a portion of the opening and is capable of being opened to access the portion of the storage compartment that remains within said outer housing when said inner housing is in the loading position.

2. A moveable closet according to claim 1 wherein said outer housing is fixed in position.

3. A moveable closet according to claim 1 wherein said inner housing comprises shelves for dividing the storage compartment.

4. A moveable closet according to claim 1 wherein said inner housing comprises bars for hanging articles.

5. A moveable closet according to claim 1 further comprising an activation mechanism for moving said inner housing between the loading and stowed positions.

6. A moveable closet according to claim 1 further comprising at least one track for guiding said inner housing between loading and stowed positions.

7. A moveable closet according to claim 5 wherein said actuation mechanism comprises a motor capable of moving said inner housing between the loading and stowed positions.

8. A moveable closet accessible from at least one lengthwise extending aisle, the moveable closet comprising:
    an outer housing having a pair of longer side walls extending in a transverse direction and a pair of shorter side walls extending in the lengthwise direction; and an inner housing defining a storage compartment and further defining an opening proximate a respective one of the shorter side walls of said outer housing and facing the lengthwise extending aisle for accessing the storage compartment, said inner housing capable of being moved between a loading position in which articles are inserted from the lengthwise extending aisle through the opening into the storage compartment and a stowed position in which said inner housing is at least partially disposed within said outer housing.

9. A moveable closet according to claim 8 wherein said outer housing is fixed in position.

10. A moveable closet according to claim 8 wherein said inner housing comprises shelves for dividing the storage compartment.

11. A moveable closet according to claim 8 wherein said inner housing comprises bars for hanging articles.

12. A moveable closet according to claim 8 wherein said outer housing contains at least one door for closing a portion of the opening, each door capable of being opened to access the top portion of the storage compartment when said inner housing is in loading position.

13. A moveable closet according to claim 8 further comprising at least one track for guiding said inner housing between loading and stowed positions.

14. A moveable closet according to claim 8 wherein said movable closet contains an actuation mechanism for moving said inner housing between loading and stowed positions.

15. A moveable closet according to claim 8 further comprising an actuation mechanism for moving said inner housing between loading and stowed positions.

16. A moveable closet according to claim 15 wherein said actuation mechanism comprises a motor capable of moving said inner housing between loading and stowed positions.

17. An interior assembly for a vehicle comprising:

a moveable closet defining a storage compartment and further defining an opening for accessing the storage compartment, said moveable closet capable of being moved between a loading position in which articles are inserted through the opening into the storage compartment and a stowed position in which said moveable closet is displaced upwardly relative to the loading position; and a seat proximate to said moveable closet, said seat capable of moving between a first position and a reclined position, wherein said moveable closet is capable of being disposed in the loading position proximate said seat while said seat is in the first position, and wherein said seat is capable of being moved to the reclined position partially underneath said moveable closet once said moveable closet is raised to the stowed position.

18. An interior assembly according to claim 17 wherein said structure is at least one of a galley, a lavatory and a fixed closet.

19. An interior assembly according to claim 17 wherein said moveable closet comprises shelves for dividing the storage compartment.

20. An interior assembly according to claim 17 wherein said moveable closet comprises bars for hanging articles.

21. An interior assembly according to claim 17 wherein said moveable closet comprises at least one track for guiding said inner housing between loading and stowed positions.

22. An interior assembly according to claim 17 wherein said movable closet comprises an actuation mechanism for moving said moveable closet between loading and stowed positions.

23. An interior assembly according to claim 22 wherein said actuation mechanism further comprises a motor capable of moving said moveable closet between loading and stowed positions.

24. An interior assembly according to claim 17 wherein said moveable closet is vertically displaced between loading and stowed positions.

25. An interior assembly according to claim 24 wherein said moveable closet is raised upwardly from the loading to the stowed position.

\* \* \* \* \*